(12) United States Patent
Schuster

(10) Patent No.: US 8,979,971 B2
(45) Date of Patent: Mar. 17, 2015

(54) PROCESS FOR PRODUCING METALLIC COMPONENTS

(75) Inventor: Rainer Schuster, Nürnberg (DE)

(73) Assignee: MAN Truck & Bus AG, Munich (DE)

( * ) Notice: Subject to any disclaimer, the term of this patent is extended or adjusted under 35 U.S.C. 154(b) by 73 days.

(21) Appl. No.: 13/465,773

(22) Filed: May 7, 2012

(65) Prior Publication Data

US 2012/0295124 A1    Nov. 22, 2012

(30) Foreign Application Priority Data

May 18, 2011    (DE) .......................... 10 2011 101 857

(51) Int. Cl.
| | |
|---|---|
| *C21B 11/10* | (2006.01) |
| *C21B 13/12* | (2006.01) |
| *C21C 5/52* | (2006.01) |
| *C21C 5/54* | (2006.01) |
| *C22B 4/00* | (2006.01) |
| *C22B 9/22* | (2006.01) |
| *B22F 3/105* | (2006.01) |
| *B22F 5/10* | (2006.01) |

(52) U.S. Cl.
CPC ................. *B22F 3/1055* (2013.01); *B22F 5/10* (2013.01); *Y10T 428/12014* (2013.01)
USPC .............................. 75/10.13; 419/7; 428/546

(58) Field of Classification Search
USPC .............................. 75/10.13; 419/7; 428/546
IPC ................ H01J 1/3048,2329/00; B22F 1/0003, B22F 5/10
See application file for complete search history.

(56) References Cited

FOREIGN PATENT DOCUMENTS

| | | |
|---|---|---|
| DE | 195 11 772 | 10/1996 |
| DE | 100 22 884 | 11/2001 |
| DE | 10 2007 059 865 | 6/2009 |
| EP | 1 358 855 | 11/2003 |
| EP | 1358855 A1 * | 11/2003 |

* cited by examiner

*Primary Examiner* — Weiping Zhu
(74) *Attorney, Agent, or Firm* — Cozen O'Connor

(57) ABSTRACT

A process for producing a metallic component with an opening or a hollow space by selective laser sintering or laser melting includes melting a metallic powder in layers at appropriate cross-sectional regions by using laser radiation. After the laser sintering or laser melting process, the component is subjected to a fracture splitting process, in which the component is fractured into at least two fractional parts along a fracture line and then the at least two fractional parts are connected to one another at the sites of fracture to form the component. The fracture line contacts or passes through the opening or the hollow space.

10 Claims, 6 Drawing Sheets

Stand

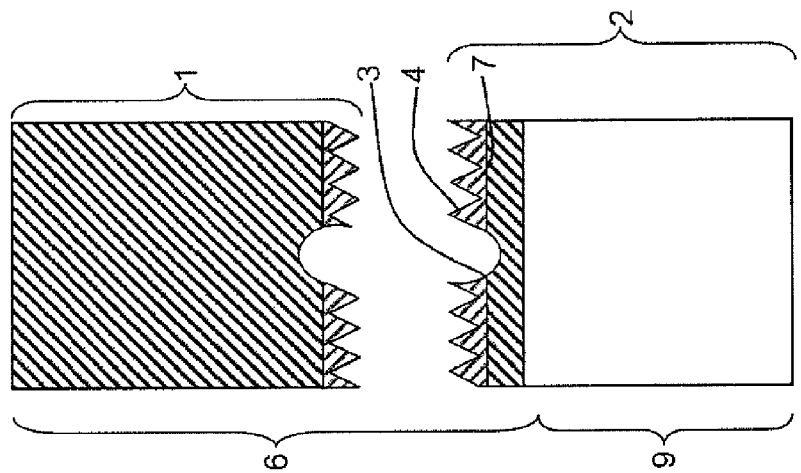
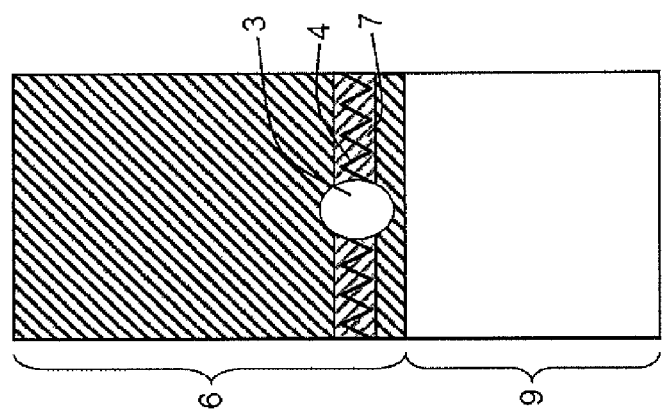
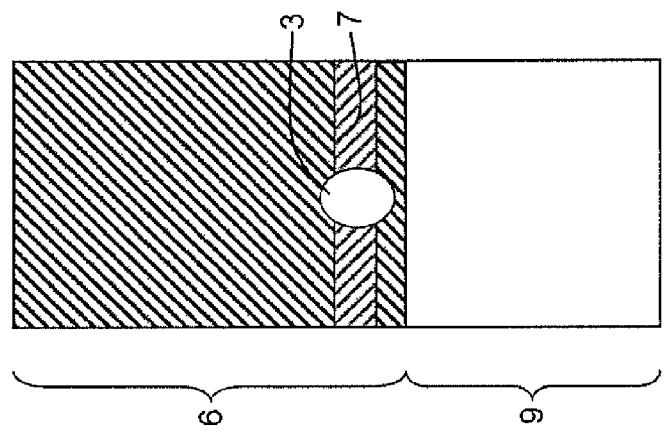

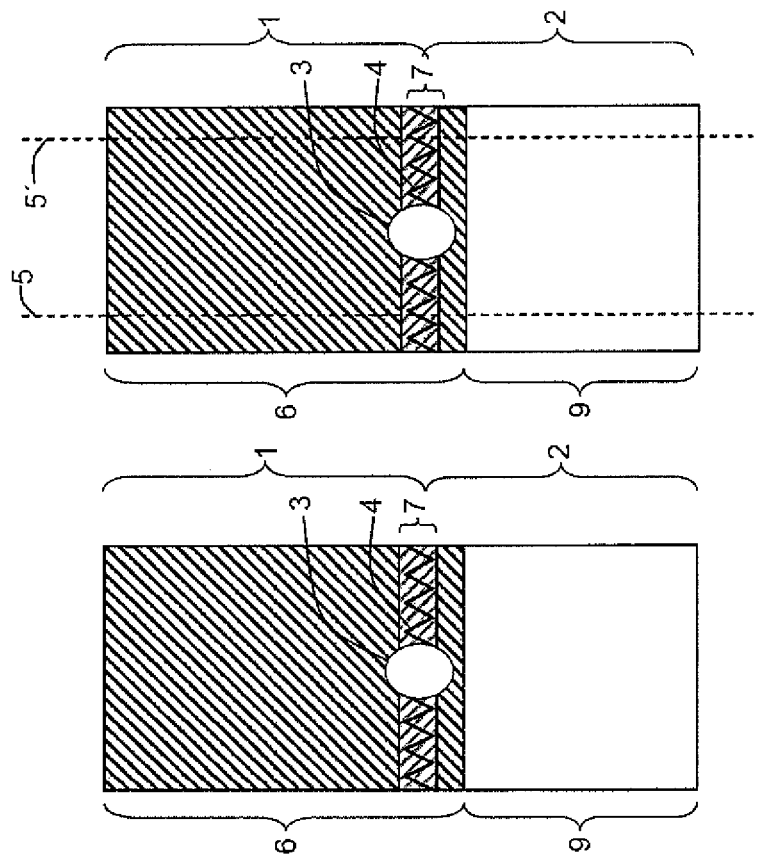
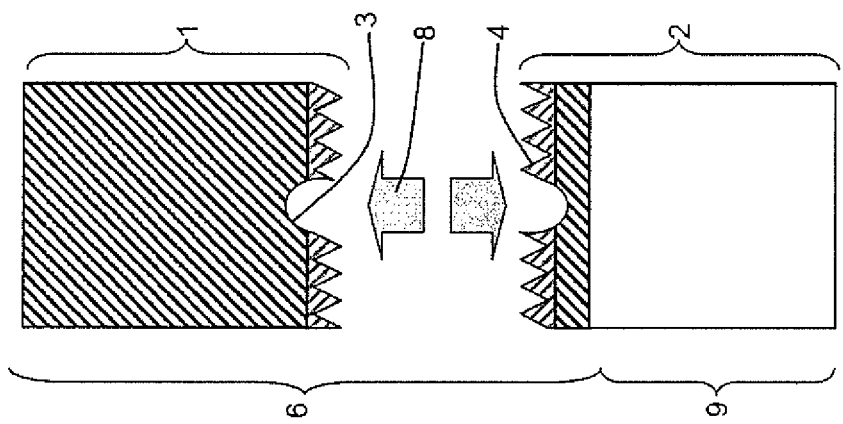

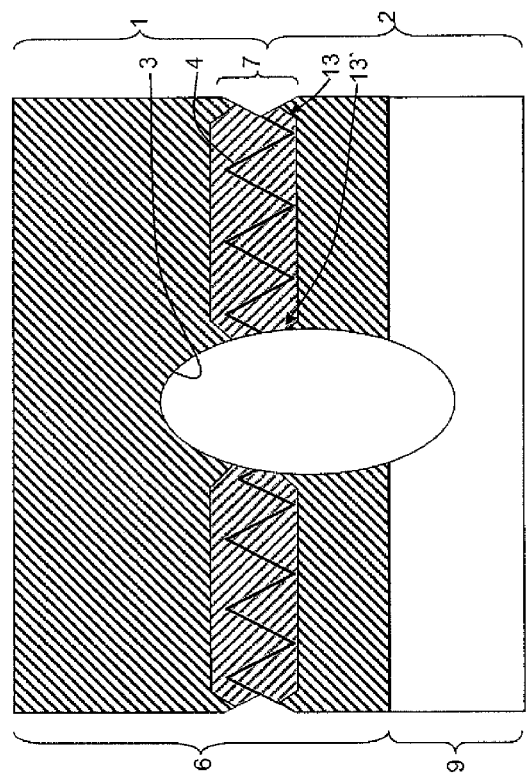
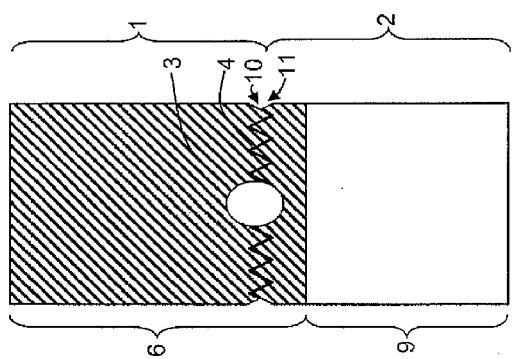

PROCESS FOR PRODUCING METALLIC COMPONENTS

BACKGROUND OF THE INVENTION

1. Field of the Invention

The invention relates to a process for producing metallic components which comprise an opening and/or a hollow space by selective laser sintering and/or laser melting, where single-component or multicomponent metallic powder is melted in layers at appropriate cross-sectional regions by using laser radiation. The process according to, the invention relates in particular to a selective laser melting (SLM) process.

2. Description of the Related Art

An example of the selective laser melting (SLM) process is described in laid-open specification DE 195 11 772 A1, in which an apparatus solidifies powder material to produce a three-dimensional object by successively solidifying layers of a pulverulent structural material at respective cross-sectional regions of the object, for example, by electromagnetic radiation or particle radiation. According to this document, the powder material is applied in powder layers to a support, which is preferably equipped with a substrate plate (substrate). After a powder layer has been applied to the substrate plate, a scanner mirror is used to deflect a laser beam onto specific layer regions in a targeted manner, such that the metal powder located there is melted and then solidifies. After a first layer has been formed, the support is lowered downwards in the installation space by a layer thickness, and a new powder layer is built up over the preceding layer by the coater. After this powder layer has been applied, a laser beam is again directed at appropriate sites of the powder material in a targeted manner to selectively melt individual powder regions. These process steps are performed repeatedly such as to produce a finished component which, after it has been freed of the remaining, unsolidified powder, substantially forms the finished component.

European patent application EP 1 358 855 A1 likewise describes a process for producing products by freeform laser sintering using an SLM process, wherein a plurality of metallic or non-metallic products are constructed on a substrate plate. According to this document, retaining webs (also referred to as supports in the document), which connect the product to be constructed to the substrate plate, are used to prevent the individual objects from lying in a powder bed in undefined form and to protect against displacement during the construction process. The retaining webs also make it easier for the individual objects to be detached from the substrate plate. The retaining webs are produced by the SLM process. So that the products can be detached more easily from the substrate plate, the retaining webs are provided with predetermined breaking points, where there is a reduction in the strength of the support along the outer contour of the products. Once the construction process has been completed, the non-solidified powder is removed from the installation space, the substrate plate together with the products located on it is taken from the system and the individual products are detached from the substrate plate by subjecting the predetermined breaking points to bending stresses. In this case, the predetermined breaking points serve exclusively for the one-off detachment of the products from the substrate plate or the process-related retaining webs.

The process of fracture splitting, together with the subsequent piecing together of the components, has emerged particularly in the field of application of automotive engineering, see, e.g., DE 100 22 884 A1. In this case, by way of example, connecting rods for internal combustion engines are produced from a ductile starting material by forging, where the still glowing forged blank is cooled locally by water jets and thereby embrittled. After the embrittlement, the connecting rod head can be separated. The rest of the connecting rod remains in the original, ductile microstructure. After this treatment, the connecting rod head, after it has been cooled, is split by fracture splitting. Bearing elements and a shaft element are inserted therein and the split connecting rod is then pieced together again.

Laid-open specification DE 10 2007 059 865 A1 likewise describes an SLM process and in paragraphs 3 and 4 explicitly sets forth the difference between selective laser melting and laser sintering processes.

The prior art for SLM processes is based on the concept of obtaining the parts produced by an SLM process as directly as possible from the process, of providing as far as possible no remachining processes therefor and of generating as far as possible single-piece components from the SLM process.

Furthermore, to produce components having closed hollow spaces it is necessary in the prior art for SLM processes to provide outlet holes through which the unsolidified powder material trapped in the hollow spaces can trickle out, in which case these outlet holes are to be closed by a plug once the hollow spaces have been emptied. In addition, in the prior art for SLM processes it is only possible to a limited extent to provide openings in an SLM component with a coating, with thermal aftertreatment and/or with a component to be arranged contiguously.

The prior art for fracture splitting processes, which provides for subsequent piecing together of the parts, is limited exclusively to castings, forgings and/or parts produced by cutting.

SUMMARY OF THE INVENTION

An object of the present invention is to develop a process for producing metallic components that have an opening and/or hollow space by at least one of selective laser sintering and selective laser melting such that a greater flexibility of design in terms of the opening and/or hollow space in the component and also a greater flexibility of processing in terms of machining and/or assembly to make further parts in or on the openings and/or the hollow spaces in the component possible and/or to require smaller installation spaces in the laser sintering and/or laser melting machines. It is a further object of the invention to make it possible to choose the arrangement of the openings and/or hollow spaces within the component more freely and/or to achieve a path for the fracture line within the component which is as defined and foreseeable as possible and also as freely selectable as possible.

According to an embodiment of the invention, after producing a component by a laser sintering and/or laser melting process, the component is subjected to a fracture splitting process, in which the component is fractured into at least two fractional parts along a fracture line and then the at least two fractional parts are connected to one another at the sites of fracture thereof to form the component. The fracture line contacts and/or passes through at least a certain region of the opening and/or the hollow space. In addition or as an alternative, a third component part may be constructed by a generative production process on at least one surface of the first fractional part after the fracture splitting and before the fractional parts are pieced together and/or connected again.

Since the opening and/or the hollow space is freely accessible in the segmented intermediate state as a result of the laser-sintered or laser-melted component being fractured and pieced together again, this "free" accessibility can be used to modify the opening and/or the hollow space and/or the site of fracture and/or to assemble a further element on the opening or the hollow space. Once the modification or the assembly is complete, the two fractional parts of the component are pieced together again and connected, it being possible for the connection to be made with an integral bond or in a positively locking manner. The modification may also comprise at least one of application of at least one of a thermal and a mechanical aftertreatment, and assembly of at least one of a seal and a body in or on the opening and/or the hollow space.

In a preferred embodiment, the energy input per unit area into the powder material proceeding from the laser beam is varied within a powder layer and/or in different powder layers, such that the powder melted under the varied energy input per unit area of the laser beam has a different material property to adjacent material regions. By varying the energy input per unit area, it is possible for example for the grain size of the solidified powder material which is formed after hardening to be varied. Thus, for example, the material property can specifically have a relatively high brittleness at certain regions of the component and a relatively low brittleness at other regions, making it possible to influence the fracture line in a targeted manner. In addition, martensitic regions, coarse grain zones or comparable differences may be established by the variations in the energy input per unit area of the laser beam. The energy input per unit area may be increased by increasing the power of the laser beam, by varying the focus or the diameter of the laser beam in the machining region and/or by reducing the speed of movement of the beam on the material to be hardened. In addition to increasing the energy input per unit area of the powder material, after the powder has been melted for the first time, the laser beam can again melt and/or heat and/or remove the powder within a powder layer at at least one, already solidified layer region, before the subsequent layer application is performed. By repeated melting and/or heating, this region can be subjected to heat treatment, in order to likewise vary the material properties at this region in a targeted manner to influence the fracture line path in a defined manner.

With respect to influencing the powder material during or after the SLM process, reference is made to the teaching of DE 10 2007 059 865 A1. In particular, the possibilities to quench and temper the workpieces in paragraphs 11 to 16 are applicable to the teaching of the present invention. Thus, for example, the component according to the present invention may be subjected to local cooling in order to influence metallurgical properties. This local influencing can be advantageous for the fracture splitting process.

According to a further embodiment of the present invention, at least one of the variation in the energy input per unit area, the further melting, the heating, and the removal by the laser beam is performed in the region of the desired fracture line. Because, in the region of the desired fracture line, the laser beam acts on the material in a varied manner in such a way that the regions there have an increased brittleness, a defined and more freely configurable path of the fracture line is permitted. With this procedure, it is therefore possible in a simple and convenient manner, and also with little outlay, to define any desired, virtually freely configurable path of the fracture line within a component which, for example, fulfils the later loading profiles and/or force profiles of the component. Thus, for example, a component provided with an opening and/or a hollow space, despite the fact that it is fractured and pieced together again for a later intended use, e.g. bending stresses, can be provided with a fracture path defined in this way which, after the fractional parts have been pieced together, has the smallest possible negative effect on the bending stresses. This can be promoted by appropriate zigzag interlocking, which represents symmetrical positive locking of the two fractional parts after they have been pieced together; with respect to advantageous fracture line paths when the component is subjected to specific forces, reference is made to the teaching of DE 100 22 884 A1.

DE 100 22 884 A1 describes a borehole or an opening for controlling the fracture path. Although this is advantageous in the process according to the invention, it is not absolutely necessary, since it is possible to sufficiently influence fracture lines by the formation of zones with a relatively high brittleness by the SLM process.

Since large-volume SLM components, in particular, are associated with a high production-related outlay and also expenditure, it is advantageous to configure the component as a hybrid component, in which case the component consists of at least two component regions, with a first component region being produced by a conventional production process, in particular by a casting process or a chip-forming process, and a second component region being produced by a selective laser sintering and/or laser melting process. The first and the second component regions are connected to one another. In particular, the second component region is constructed directly on the first component region by a selective laser sintering and/or laser melting process.

It is preferable for the large-volume, geometrically less demanding component region to be produced by a casting process or a chip-forming process. Then, powder material is gradually applied again to at least one surface of the first component region and selectively solidified. In a particularly preferred embodiment, in addition to the opening and/or the hollow space which comes into contact with and/or passes through the fracture line, provision is made of further hollow spaces, for example channels for guiding a medium, which extend from the first, conventionally produced component region into the second component region produced generatively by the SLM process.

According to a further embodiment, geometrically formed predetermined breaking points are arranged in the region of the fracture line at least in certain regions. These can be produced, for example, by the powder material located there being not fully solidified by not undergoing complete and/or all-over melting. The component regions which are not solidified in this way therefore make no contribution to the strength of the component, and therefore these sites preferably fracture.

As an alternative or in addition thereto, the component, after the laser sintering and/or laser melting process, undergoes material removal and/or material weakening, which lies in the superficial region of the fracture line, by the superficial action of the laser and/or a chip-forming tool. To this end, it is particularly advantageous if use is made of the laser from the laser sintering and/or laser melting process for material removal and/or for material weakening. As a result of these additional measures, the material property and in particular the fracture behaviour of the component in the region of the fracture line can be influenced further in a defined manner.

In addition to the above-described process, the present invention also encompasses a component with an opening and/or a hollow space, which comprises at least one generatively constructed component region which is formed by a selective laser sintering and/or laser melting process, wherein powder material which has been applied is melted in layers by the action of a laser beam at appropriate sites of the component. The component consists of at least two interconnected fractional parts, which were formed by subjecting the component produced by the laser sintering and/or laser melting process to fracture splitting along a fracture line, and in this case the fracture line at least one of contacts and passes through the opening and/or the hollow space at least in certain regions. In this case, this component has the advantage that the arrangement, design, and orientation of the opening and/or the hollow space are freely configurable, and also that the opening and/or the hollow space can be subjected more easily and in the first place to at least one of a specific modification and assembly of further parts.

The component preferably includes two interconnected component regions, wherein a first component region is produced by the selective laser sintering and/or laser melting process and a second component region is produced by a conventional production process, in particular by a casting process or a chip-forming process. In this case, the fracture line runs through the first component region, which is generated by means of SLM processes. By forming at least certain regions of the component by a conventional production process, it is possible to significantly reduce the production costs, since the volumetric proportion of the selective laser sintering and/or laser melting process is reduced.

It is preferable for the first and the second fractional parts to be detachably connected to one another, in particular in a positively locking manner, and/or for the first and the second component regions to be nondetachably connected to one another, in particular with an integral bond. The positive locking can be achieved, for example, by a screw or a riveted connection. The integral bond may be achieved by adhesive bonding or build-up welding.

In a particularly preferred embodiment, the opening in the component through which the fracture line runs or which is adjoined by the fracture line is in the form of a bearing region for directly or indirectly mounting a rotatably mounted part. Particularly if the rotatably mounted part can be inserted into the temporarily segmented, "broken-open" opening, when the first component region is fractured along the fracture line, and the first component is pieced together after the rotatably mounted part has been inserted into the opening, this can simplify the assembly of the rotatably mounted part on the component considerably. This is the case in particular if the contact surface is a tapered region within the rotatably mounted part which could not be inserted into the "closed" opening which is not broken open. In addition to a rod-like element, the rotatably mounted part can also comprise bearing shells, which can be mounted in this way in the opening in the component.

In a preferred embodiment, the component is an engine part, more particularly an engine attachment part, such as, a connecting rod, a cylinder head, a crankcase, an exhaust system, an oil module, a camshaft bearing, a chassis part, a crankshaft bearing and/or a component part of the aforementioned parts. In principle, this process is also advantageous for components of any type, in particular casing parts, cover elements, dental parts, bearing elements, connection and/or interface regions of metallic parts.

It is preferable for at least that component region which is constructed by a selective sintering and/or laser melting process to be formed from one of aluminium, high-grade steel, hot-work steel, titanium, and a nickel-based alloy. In this context, it is essential that the regions of the component can be provided with different material properties, in particular with a different brittleness, by appropriately varying the laser beam during the generative construction process.

In one embodiment of the present invention, the at least one opening and/or hollow space which makes contact with the fracture line extends both into the component region which is constructed by a selective laser sintering and/or laser melting process and into the component region which is constructed by a different type of production process. In spite of a relatively large opening and/or a relatively large hollow space, this measure allows the proportion of the generatively produced component region to be small compared to the conventionally produced component region.

In a particularly preferred embodiment, a component region constructed by a selective laser sintering and/or laser melting process is constructed on a conventionally produced component region in each case at two surfaces of the component region, with at least one of these regions comprising the opening and/or the hollow space. The two surfaces are preferably two opposing surfaces.

Since the fracture line lies in the generatively constructed component region, and this makes it possible to "control" the fracture behaviour of the component region and therefore to design the fracture line in a defined manner, it is possible to initiate a fracture which manages without notches and/or other measures acting superficially on the component, such that the outer contour or the lateral surface of the component region does not have to be provided by fracture-specific promoting measures (e.g. notches). Nevertheless, it is possible, however, for such promoting measures to be used in the process according to the invention.

In an alternative embodiment for producing metallic components by selective laser sintering and/or laser melting, a single-component or multicomponent metallic powder is melted in layers at appropriate cross-sectional regions by using laser radiation, wherein after the laser sintering and/or laser melting process, the component is subjected to a fracture splitting process, in which the component is fractured into at least two fractional parts along a fracture line. The at least two fractional parts are connected to one another at the sites of fracture thereof to form the component, wherein a component region is constructed by a generative production process on at least one surface of at least one of the fractional parts after the fracture splitting and before the reconnection. This makes it possible to achieve a large component as a whole using only a small installation space for the second generative construction process. This is because firstly a generative component is formed, is then fractured into fractional parts and thereafter only one fractional part has to be inserted into a selective laser sintering and/or laser melting apparatus in order to construct a further generative component region on at least one surface of said fractional part. After the second component region has been completed, the first and the second fractional parts can be pieced together again, such that the component as a whole is greater than the individual fractional parts. This alternative embodiment provides that at least the region at the fracture line of the two fractional parts comprises an opening and/or a hollow space.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail on the basis of exemplary embodiments in the figures of the drawings, in which:

FIGS. 2a-e are schematic illustrations of a fracture splitting process according to an embodiment of the present invention for a selective laser melted component;

FIG. 3 is a schematic illustration of a component according to another embodiment of the present invention which has been reconnected after being pieced together;

FIG. 7 is a schematic illustration of an alternative embodiment of the component according to the invention shown in FIG. 2e of the drawings, in which the component comprises a superficial notch in the region of the fracture line; and FIG. 8 is a schematic detailed illustration of the component shown in FIG. 7, in which the powder material has been provided with a higher brittleness in the region of the fracture line by varying the energy input of the laser (influenced fracture zone);

DETAILED DESCRIPTION OF THE PREFERRED EMBODIMENTS

Figure 1D:
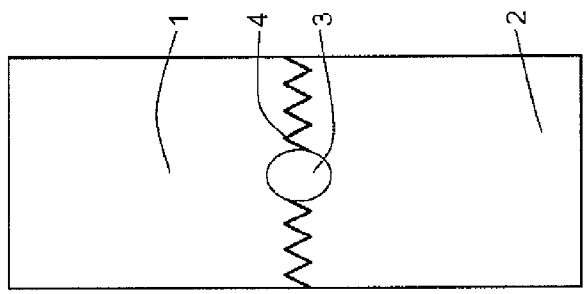
FIGS. 1a-d are schematic illustrations of a prior art fracture splitting.
Figure 1C:
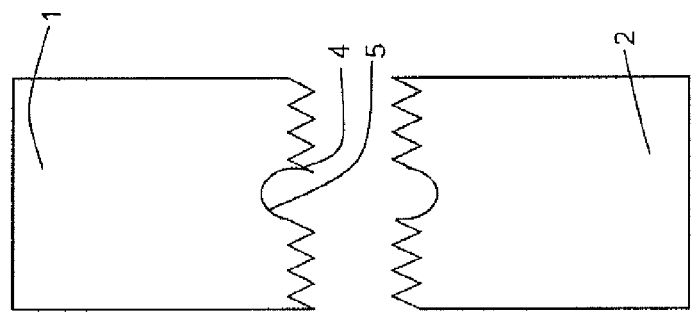
Figure 1B:
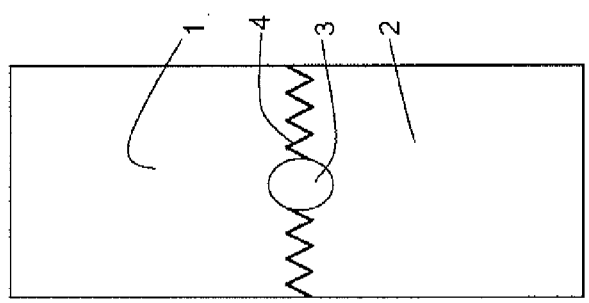
Figure 1A:
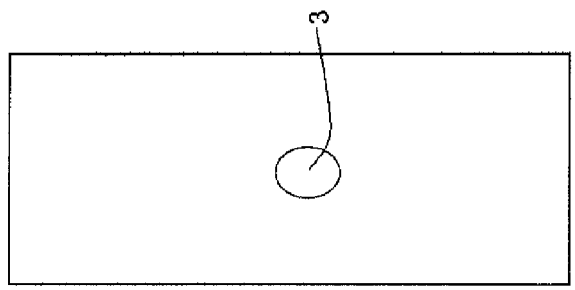

FIGS. 1a to 1d of the drawings show a fracture splitting process according to the prior art, in which a homogeneous component which has been obtained from a casting or forging process is provided with a borehole 3'. This component is fractured into two fractional parts 1', 2' along a fracture line 4', as shown in FIGS. 1b and 1c, and pieced together again, as shown in FIG. 1d.

The process shown in FIGS. 2a-2d provides for a metallic component to be provided with an opening 3 and/or a hollow space, wherein the component is melted by a selective laser sintering and/or laser melting process in layers by way of a single-component or multicomponent metallic powder at the appropriate cross-sectional regions by laser radiation. After construction by a laser sintering and/or a laser melting process, the component is subjected to a fracture splitting process (see FIGS. 2b and 2c), in which the component is fractured into at least two fractional parts 1, 2 along a fracture line 4. As shown in FIG. 2e, the fractional parts 1, 2 are connected to one another or pieced together again at the sites of fracture thereof, and therefore at the fracture line 4 thereof, to form the component. The fracture line 4 runs at least in certain regions such that it contacts and/or passes through the at least one opening 3 and/or the at least one hollow space. As shown in FIG. 2e, the connection can be achieved by an integral bond, e.g. by adhesive bonding. As shown in FIG. 3, in addition to or instead of an adhesive bond, the connection may be made between the two fractional parts 1, 2 by a positively locking connection, e.g. a screwed or riveted connection, as indicated by the dashed lines 5, 5'.

The component has a first component region 6 which was constructed generatively by a laser sintering and/or laser melting process, where the laser intensity or the input per unit area into the powder material proceeding from the laser beam is varied during the laser sintering and/or laser melting process. In addition or as an alternative, the variation can also include the laser beam again melting and/or heating and/or removing the powder, after the powder has been melted for the first time, within a powder layer at at least one, already solidified layer region. The variation in the energy input per unit area of the laser forms a zone 7, 7' within the first, generatively constructed component region 6 which has a different component property, in particular a different brittleness, to adjacent zones.

It is preferable for the zone 7, 7' to be arranged in the region of the fracture line 4. By way of example, the zone 7 is distinguished by a higher brittleness compared to adjoining zones, and during the fracture splitting therefore forms the region at which the fracture line 4 is formed. FIG. 2d shows the broken-open intermediate state of the fractional parts 1 and 2, in which the arrows 8 indicate an action on the open fracture line 4 and/or the broken-open opening 3 or the broken-open hollow space. This allows, after the fracture splitting and before the fractional parts 1, 2 are connected to one another, for at least one opening 3 and/or a hollow space and/or the fracture line 4 to be subjected to thermal and/or mechanical aftertreatment at least in certain regions, to be provided with a coating at least in certain regions and/or for a body to be inserted or attached. By way of example, appropriate heat treatment makes it possible to reduce the degree of brittleness in the zone 7 or at the fracture line 4 and/or the opening 3 again. Thus, for example, an adhesive and/or sealing coating can prevent individual, smaller fractional parts from being separated from the fracture line 4.

In the embodiments shown, the component consists of at least two component regions 6, 9, wherein the component region 9 is produced by a conventional production process, in particular by a casting process and/or a chip-forming process, and a second component region 6 is produced by a selective laser sintering and/or laser melting process. In this case, the first and the second component regions 6, 9 are connected to one another. It is preferable for the second component region 6 to be constructed directly on the first component region 9 by the selective laser sintering and/or laser melting process. Alternatively, the two component regions 6, 9 can also be connected to one another by adhesive bonding, build-up welding or similar processes. As an alternative or in addition, it is also possible to employ positively locking and/or detachable connections to connect the first and second component regions 6, 9.

In addition to the above-described zone 7, which, if it has a brittle form, allows as an adjacent zone to influence the fracture line 4 in a targeted manner, the region (zone 7) can also have a geometrically formed predetermined breaking point 10. Such a predetermined breaking point 10 can be generated, for example, in that the powder material there is melted and solidified incompletely or not over the entire surface. In turn, as an alternative or in addition thereto, after the laser sintering and/or laser melting process, the component can undergo material removal and/or material weakening, which lies in the superficial region 11 of the fracture line 4, by the superficial action of a laser and/or a chip-forming tool. In particular, this material removal and/or this material weakening can be performed by the laser from the laser sintering and/or laser melting apparatus.

The component according to an embodiment of the present invention includes the opening 3 in which can be formed, for example, as a bearing region for directly or indirectly mounting a rotatably mounted means (not shown). The component can be an engine attachment part, in particular a connecting rod, a cylinder head, a crankcase and/or a non-engine part, for example a dental part and/or a plastics injection moulding tool and/or a component part of the aforementioned parts.

In FIG. 8, the opening 3 is formed such that it extends both in the region of the first, generatively produced component region 6 and also into the region of the second, conventionally produced component region 9. In spite of a relatively large or elongate opening 3, the component can therefore also be designed with the hybrid construction principle, such that the volume and/or the dimensioning of the generative component region 6 can be kept relatively small.

FIG. 8 also shows that the zone 7 is provided with a reduced cross section of the zone 7 both at the edges thereof which are close to the superficial region 11 and at the regions 12 located in the vicinity of the opening 3, i.e., regions of reduction 13, 13'. This takes into account the fact that, in the event of fracture, the fracture line 4 forms within the zone 7, and that the start and end point of the fracture line 4 can be construed to be "more defined", since the fracture line 4 preferably forms within the zone 7.

Figure 4:
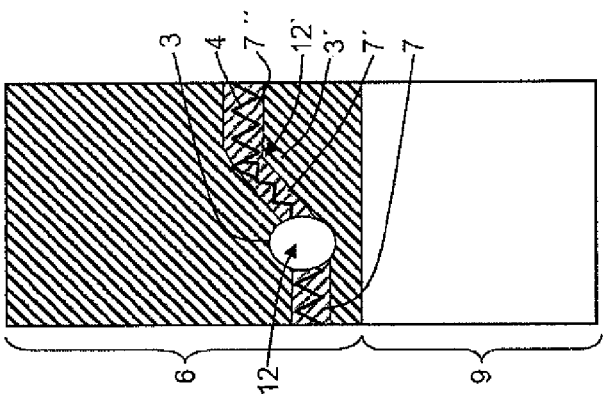
FIG. 4 is a schematic illustration of an alternative embodiment of the present invention, in which the component comprises two conventionally produced component regions and one generatively produced component region.

In the embodiment shown in FIG. 4, the generatively constructed component region 6 is in turn minimized to the site of fracture, since this component comprises 3 component regions, where the middle component region 6 has been produced generatively and the upper and lower component regions 9, 9' have been produced conventionally. In this case, by way of example, the component region 6 can be constructed generatively on the component region 9, and then the component region 9' can be bonded integrally and/or in a positively locking manner to the second surface of the component region 6.

Figure 5:
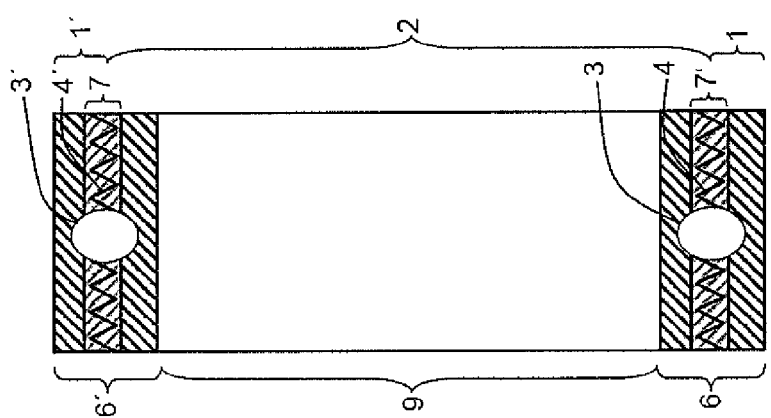
FIG. 5 is a schematic illustration of a component with an alternative configuration, consisting of two generatively produced component regions and one conventionally produced component region.

According to FIG. 5, the "sandwich structure" is reversed, such that a middle region 9 is constructed by a conventional production process and two component regions 6, 6' are each constructed by a generative production process, with the fracture lines 4, 4' being arranged in each case in the generative component regions 6, 6', where they are preferably located in the brittle zones 7, 7'.

Figure 6:
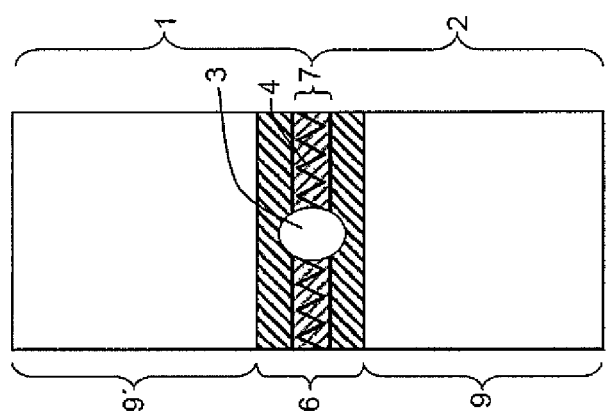
FIG. 6 is a schematic illustration of a component according to yet another embodiment of the present invention in which the fracture line has a kink.

FIG. 6 schematically shows that the path of the fracture line 4 does not necessarily have to run on one plane, but instead can also comprise kink regions 12. FIG. 6 shows another kink region 12' that is not provided with an opening 3.

Figure 11:
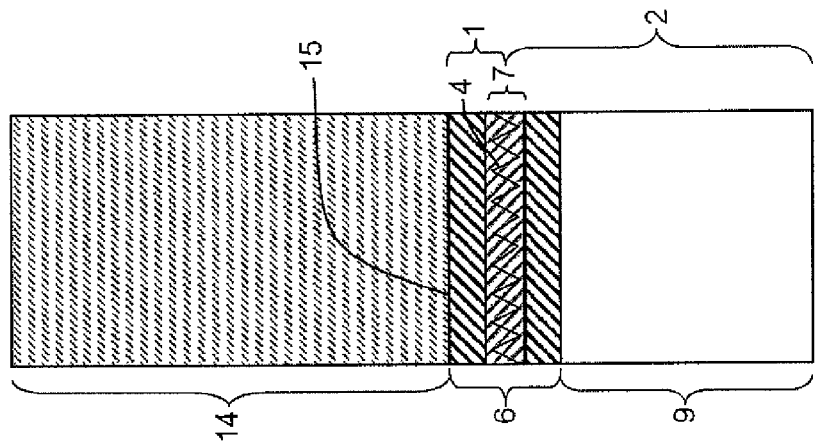
FIG. 11 is a schematic detailed illustration of the components of FIGS. 9 and 10 pieced together.
Figure 10:
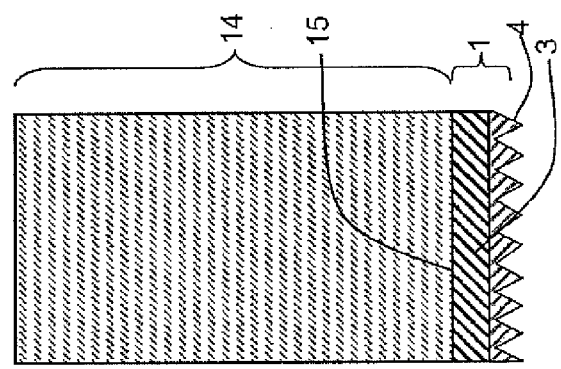
FIG. 10 is a schematic detailed illustration of the component of FIG. 9 after fracture splitting and with an additional generatively produced component region.
Figure 9:
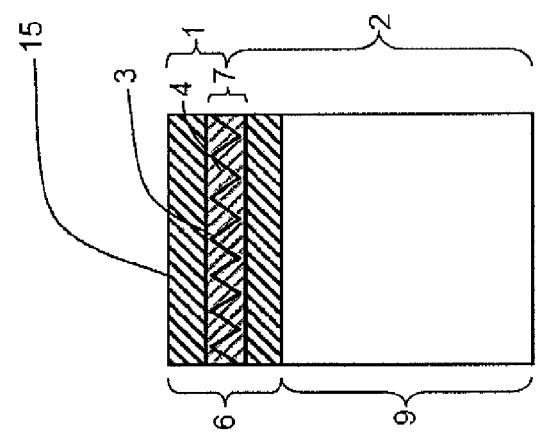
FIG. 9 is a schematic detailed illustration of a component according to a further embodiment with a generative component region and a conventionally produced component region.

According to FIGS. 9 to 11, the component according to the invention does not have to be provided with an opening 3. In certain cases, it is sufficient if the fracture line 4 is influenced exclusively by varying the intensity of the laser beam to form a brittle zone 7.

Furthermore, FIGS. 9 to 11 show a component which is provided by the generative construction of a first, generative component region 6 on a second, conventionally produced component region 9. A zone 7 is formed within the first component region 6 by changes in the energy input per unit area of the laser. The fracture line 4 forms within this zone 7 in the fracture process, and the fractional parts 1 and 2 are formed. After the fracture splitting, a third, generatively produced component region 14 is constructed (e.g., by SLM) on the surface 15 of the first fractional part 1, see FIG. 10. Finally, the first and the second components 1, 2 are pieced together or connected, such that a larger component as a whole consisting of the component regions 6, 9 and 14 is formed, see FIG. 11. The generatively produced component regions 9 and 14 can be formed by the same or different SLM processes and/or can consist of the same or different structural material compositions.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A process for producing a metallic component with at least one of an opening and a hollow space, comprising:
   (a) melting single-component or multicomponent metallic powder by at least one of selective laser sintering and laser melting, wherein the single-component or multicomponent metallic powder is melted in layers at appropriate cross-sectional regions using laser radiation to produce the component;
   (b)(i) wherein during the step of melting a variation in the energy input per unit area into the powder material proceeding from the laser beam is effected within one powder layer or in different powder layers; or
   (b)(ii) after the powder has been melted for the first time but before a subsequent layer is applied, the laser beam further melts, heats, or removes the powder within a powder layer at at least one already solidified layer region; and
   (c) after the melting, subjecting the produced component to a fracture splitting process, in which the component is fractured into at least two fractional parts along a predetermined fracture line; and then
   (d) connecting the at least two fractional parts to one another at the sites of fracture thereof to form the component, wherein at least a certain region of the fracture line contacts or passes through the at least one of the opening and the hollow space.

2. The process of claim 1, wherein the variation in the energy input per unit area, the further melting, the heating, or the removal by the laser beam is performed in the region of the fracture line.

3. The process of claim 1, after the fracture splitting and before the fractional parts are connected to one another, the at least one of the opening and the hollow space:
   undergoes at least one of a thermal and mechanical aftertreatment at least in certain regions,
   is provided with a coating at least in certain regions, or
   receives or is attached to a body.

4. The process of claim 1, wherein the component includes at least first and second component regions, wherein the first component region is produced by the at least one of selective laser sintering and laser melting and the second component region is produced by a conventional production process, in particular by a casting process or a chip-forming process, with the first and the second component regions being connected to one another.

5. The process of claim 4, wherein the first component region is constructed directly on the second component region by the at least one of selective laser sintering and laser melting.

6. The process of claim 1, forming, in the region of the fracture line, geometrically formed predetermined breaking points.

7. The process of claim 6, wherein the predetermined breaking points are formed where at least one of complete and all-over melting of the powder is not effected.

8. The process of claim 1, wherein, after the at least one of laser sintering and laser melting process, the component undergoes at least one of material removal and material weakening, which lies in the superficial region of the fracture line, by the superficial action of a laser or a chip-forming tool.

9. The process of claim 8, the one of material removal and material weakening is effected using the laser from the at least one of laser sintering and laser melting.

10. A process for producing a metallic component, comprising:

melting single-component or multicomponent metallic powder by at least one of selective laser sintering and laser melting, wherein the single-component or multicomponent metallic powder is melted in layers at appropriate cross-sectional regions using laser radiation to produce the component, after the melting, subjecting the produced component to a fracture splitting process, in which the component is fractured into at least two fractional parts along a predetermined fracture line;

connecting the at least two fractional parts to one another at the sites of fracture thereof to form the component; and constructing a component region by a generative production process on at least one surface of at least one of the fractional parts after the fracture splitting and before the reconnection.

* * * * *